Inventors
LEWIS J. STOFFER
DUDLEY O. LOSEE

ATTORNEY

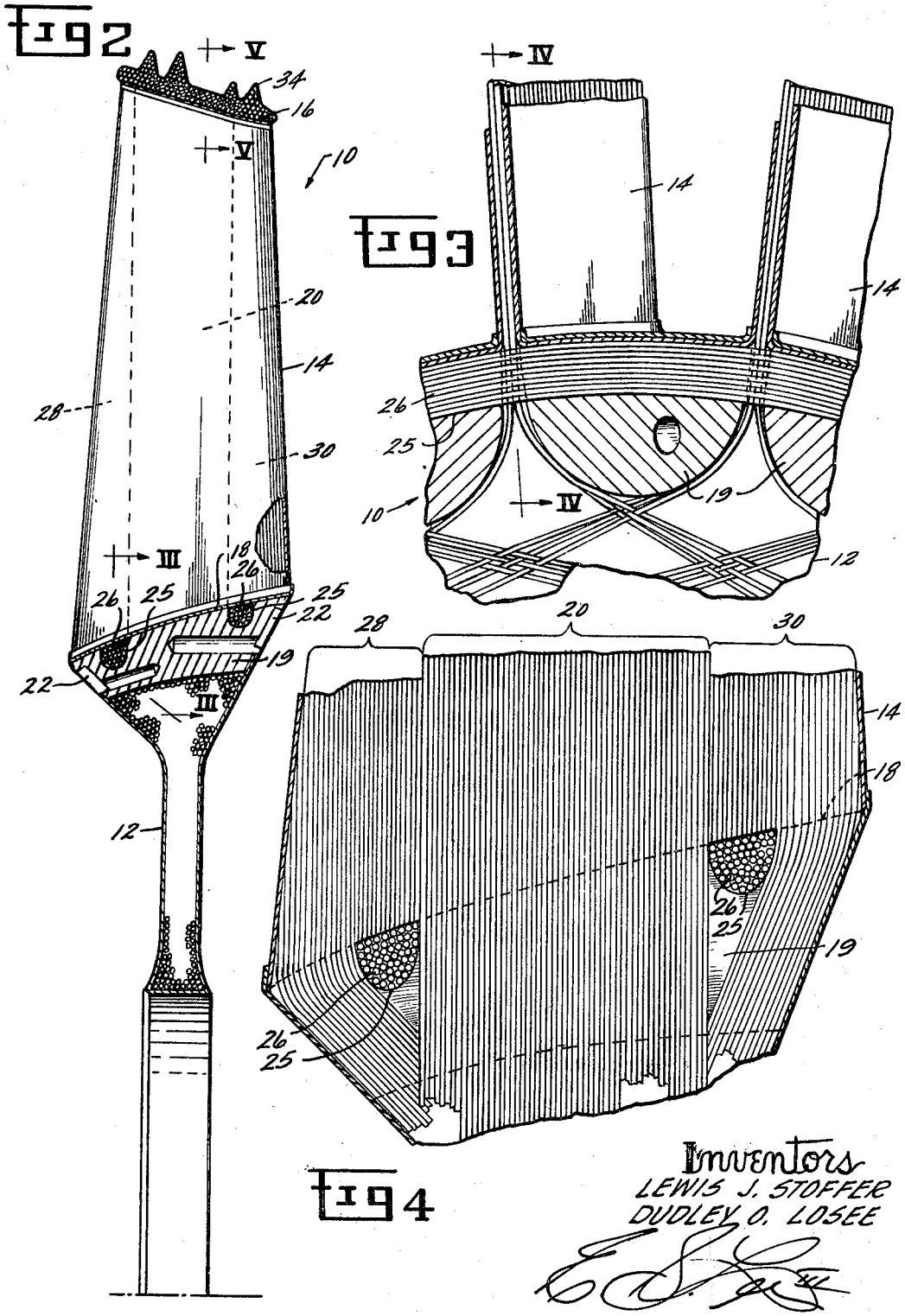

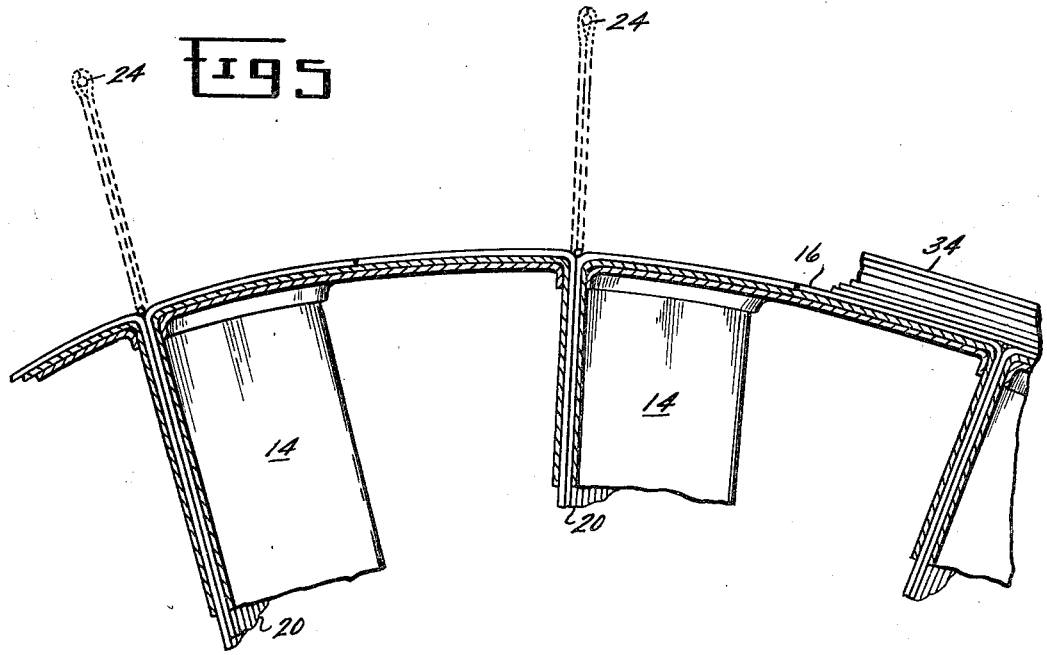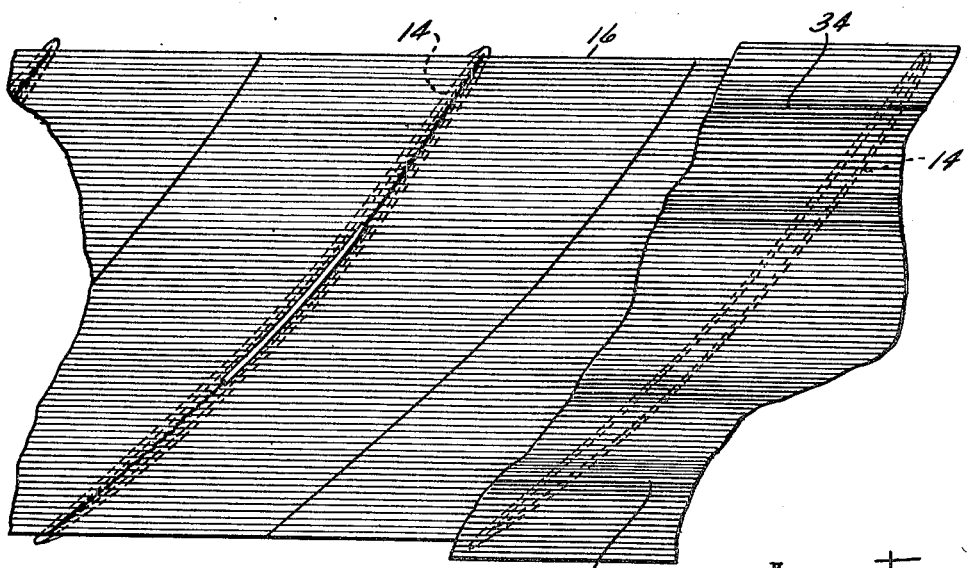

United States Patent Office 3,501,090
Patented Mar. 17, 1970

3,501,090
COMPOSITE BLADED ROTORS
Lewis J. Stoffer, Cincinnati, Ohio, and Dudley O. Losee, La Mesa, Calif.; said Stoffer assignor to General Electric Company, a corporation of New York; said Losee assignor to Whittaker Corporation, Los Angeles, Calif., a corporation of California
Filed Jan. 29, 1968, Ser. No. 701,300
Int. Cl. F04d 29/26
U.S. Cl. 230—134                              10 Claims

ABSTRACT OF THE DISCLOSURE

The disclosure shows a compositely formed integral, light weight bladed rotor for use in the compressor section of a gas turbine engine. The central portion of the blades are formed by filaments extending radially of the blade, through a central disc and then radially through another blade. Pedestals are respectively disposed at the bases of these blades to provide platform surfaces defining the inner bounds of the air flow path. The pedestals are restrained in a radial direction against the effects of centrifugal force by a pair of hoops which are wound into grooves fore and aft of the central portion of the blades. The remainder of the blade form is provided by "patch pieces" which, in part, overlie the wound hoops and which further have strands woven into the fibers forming the central disc. An outer shroud defines the outer bounds of the air flow path and is formed by folding extensions of the blade fibers in opposite circumferential directions and winding a hoop structure thereabout. The several portions of the bladed structure, through which are flows, are surfaced with a sheet material. All of these components are bonded together to form an integral composite structure.

---

The present invention relates to improvements in bladed rotor structures and, more particularly, to structures of this type which are employed in turbomachinery.

It has for some time been recognized that composite materials offer great potential in meeting the need for reducing weight of gas turbine engines, to the end of increasing the thrust to weight ratio of such engines. There have been several proposals to employ glass fibers bonded together by a suitable plastic resin to obtain high strength and rigidity from a lightweight structure formed in such a composite fashion. The high force loadings on such structures and the complexities involved, in meeting aerodynamic loadings as well as centrifugal loadings, has limited the size and rate of rotation of such composite rotors so that their potentialities have not been fully realized.

One significant improvement in composite rotor construction has been in the utilization of tensioned filaments which are drawn inwardly and outwardly to form, at least in part, the cambered blades employed in such items as compressor rotors. Such improvements are described and claimed in copending application Ser. No. 672,106, filed Oct. 2, 1967, and of common assignment.

While the method and bladed rotor described in this application provide superior strength to the blade elements, nonetheless there have been serious limitations on the use of this blade because of the further requirement of providing, as an integral portion of the rotor, platforms between adjacent blades which will define the inner bounds of the flow path through the fan rotor.

One project of the present invention is to provide an improved compositely and integrally formed turbomachinery rotor having platform portions between adjacent blades which possess a high degree of structural integrity.

Another object of the invention is to accomplish the above end and, further, to take advantage of the improved structural integrity of blades which are formed, at least in part, by filaments drawn under tension radially inwardly and outwardly of the blades from a central disc, also formed, at least in part, by these same filaments.

A further object of the invention is to accomplish the above ends and additionally provide for overall rigidity of the blades through an improved outer shroud, particularly where low modulus filaments such as glass fibers are employed in the composite material.

These ends are attained in a rotor construction wherein tensioned fibers extend lengthwise of and form portions of radially extending blades. The tensioned fibers extend into, and also form, at least in part, a central disc. A plurality of pedestal elements are disposed between the blades at their bases adjacent the disc. These pedestals define the inner bounds of the air flow path through the rotor and are finely held in place by a circumferentially wound hoop of filament material. The described components of this component rotor are appropriately bonded together to form an integral structure.

Preferably "patch pieces" overlie the portions of the pedestals about which the filament hoop is wound so as to extend the airfoil portions of the blade substantially throughout the axial distance of the pedestals. Further it is preferred that the tensioned fibers form the central cores of the blades, that the pedestals have grooves fore and aft of these central cores, and that the circumferential hoops are wound in these grooves. The "patch pieces" then take the form of radially disposed fibers, which form the leading and trailing edges of the blade. The portions of these fibers fore and aft of the two wound hoops extend inwardly and are woven into the filament-formed disc. The blades compositely formed by such a central core and "patch pieces" may then be preferably covered with sheet material bonded thereto to provide further structural rigidly for the blades. Additionally, an outer shroud may be formed by diving the fibers forming the blades, in opposite circumferential directions, and then overwinding these portions with a further outer wound hoop, so that the outer shroud gives further structural rigidity to the blades and defines the outer bounds of the flow path through the rotor.

The above and other related objects and features of the invention will be apparent from a reading of the following description of the disclosure found in the accompanying drawings and the novelty thereof pointed out in the appended claims.

In the drawings:

FIGURE 2 is a longitudinal half-section through the blade seen in FIGURE 1;

FIGURE 3 is a section, on an enlarged scale, taken on line III—III in FIGURE 2;

FIGURE 4 is a section taken on line IV—IV in FIGURE 3, along the chord of the blade;

FIGURE 5 is a section, on an enlarged scale, taken on line V—V in FIGURE 2, and further illustrating in phantom a method employed in the forming of a blade; and FIGURE 6 is a view, with portions broken away, looking down on the outer surface of the portion of the rotor seen in FIGURE 5.

Figure 1:
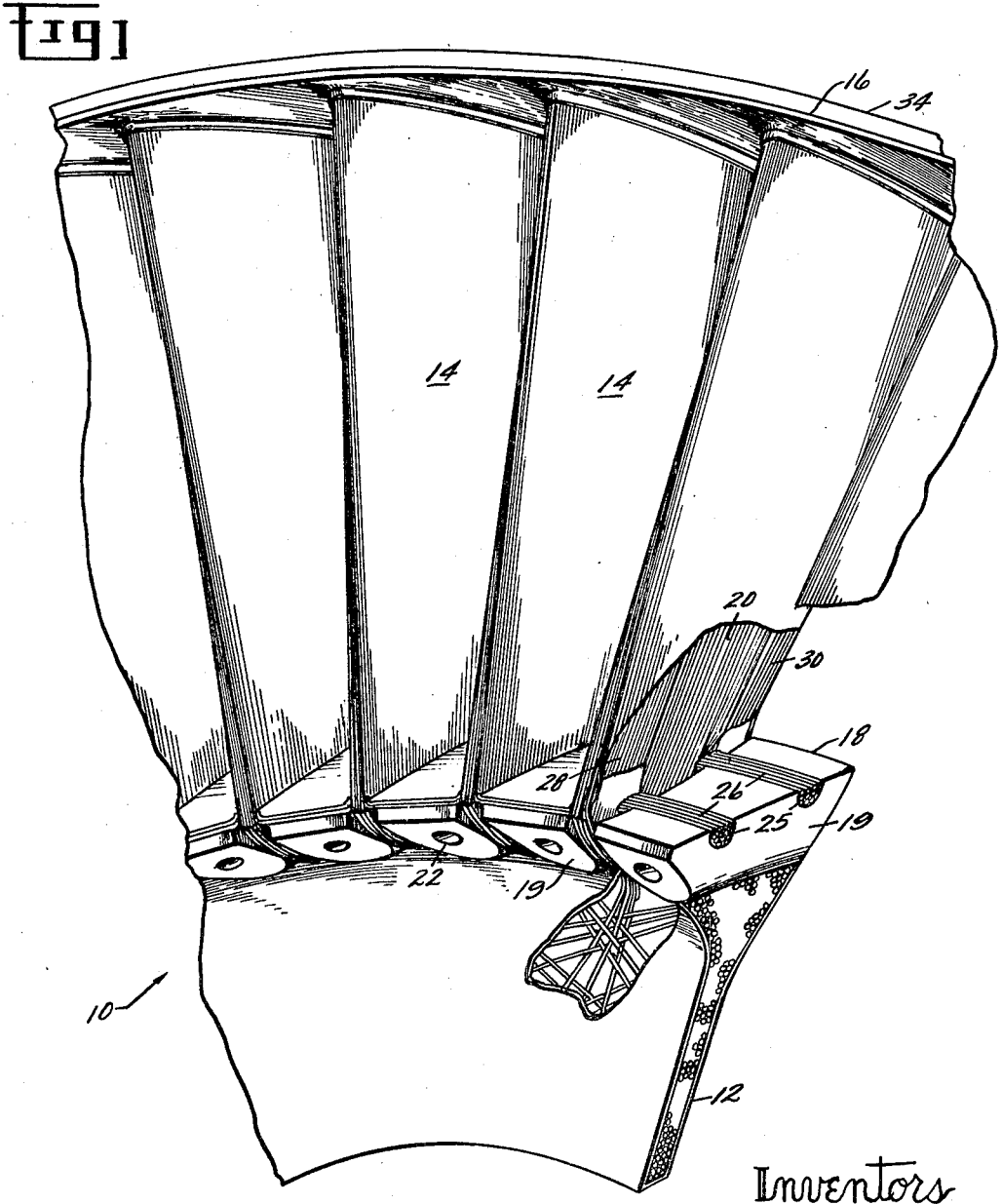
FIGURE 1 is a fragmentary perspective view of a compressor rotor embodying the present invention.

Referencing first FIGURES 1 and 2, a compressor rotor 10 is shown. This rotor comprises an inner annular disc 12, a plurality of cambered airfoil blades 14 projecting radially therefrom, and an outer shroud 16 joining together the outer ends of the blades 14, as well as defining the outer bounds of the fluid flow path through the rotor. The inner bounds of the fluid flow path through the rotor is defined by platforms 18, disposed between the blades 14 at their bases where they radiate from the disc 12. In its intended use, the rotor 10 would be mounted on a shaft (not shown) and driven to compress air in sustaining operation of a gas turbine engine.

The described rotor is compositely formed of filaments, pedestal elements 19 providing the platforms 18, and sheet material, all appropriately bonded together to provide an integral structure. The present invention deals with the manner in which these various components are formed and is intended to provide a high strength to weight structure which takes maximum advantage of the high strengths and moduluses of elasticity (for rigidity) of materials in filament form. One preferred filament is glass fibers, in which case epoxy resin would be a preferred bonding agent. These materials are primarily of advantage in relatively cool working temperatures, as would be found in the fan or compressor of a gas turbine engine. Metallic filaments and non-organic bonding agents can also be utilized, particularly in turbine rotors where high temperature environments exist.

To describe the specific configuration illustrated, each of the blades 14 is comprised of a central core of radially extending filaments, within the bracket 20 in FIGURE 4. The core filaments 20 are wound or drawn generally in accordance with the teachings of the above-referenced application so that they bend inwardly through the central disc 12 (forming the disc at the same time) and then extend to another of the blades. The core fibers 20 provide a high degree of strength and rigidity to the blades.

It will be noted that as the central fibers 20 are drawn into or from the disc 12, they form generally triangularly shaped voids at the bases of the blades. The pedestals 19 are provided with generally semicircular lower or inner surfaces so that they can be provided in these voids with a minimum of stress loading on the fibers 20. The pedestals are of a lightweight construction. At low temperatures they may be formed of a rigid thermosetting resin and cored to minimize weight.

To further explain the manner in which the rotor is formed, the pedestals 19 may be mounted in a mold on appropriate locating pins received by positioning holes 22, seen in FIGURE 2. A continuous strand of fibers may be drawn radially outwardly between the pedestals around pins 24 illustrated in phantom in FIGURE 6 and then radially inwardly, passing through the disc portion 12 and then between another pair of pedestals, to extend radially outwardly around another pin, then radially inwardly through the disc and so on until the full width of the core fibers is thus fashioned.

The pedestals 19 have grooves 24 formed in their outer surfaces. Hoops 26 are formed by winding, under tension, strands of filament into these grooves. Preferably one of the hoops 26 is wound while the pedestals are positioned in a die, the core fibers 20 are then wound as described, and thereafter the second hoop 26 is wound.

The airfoil shape of the blades is completed through the provision of "patch pieces" 28 and 30 at the leading and trailing edges of the blades enabling the blades to extend the full axial length of the platforms. The "patch pieces" preferably comprise radially extending filaments and, in part, overlie the wound hoops 26 and, in part, extend therebyond, in a fore and aft sense. The portions extending beyond the hoops also extend radially inwardly and are woven into the fibers 20 forming the disc, thus giving greater radial strength to the leading and trailing edge portions of the blades.

The outer shroud 16 is formed, in part, by the fibers of the blade. Thus, the core fibers 20 which were wound around the pins 24 can be cut so that half of these fibers will be laid in one circumferential direction and the other half in the opposite circumferential direction to abut similarly laid fibers of the adjacent blades and thus form the inner portion of the shroud 16. The fibers of the "patch pieces" 28 and 30 may be similarly laid so that the inner portion of the shroud comprises fibers which are integral with the blades. The outer portions of the shroud 16 are formed by winding a continuous strand of filaments. Further, and in particular connection with the use of this rotor in a compressor of a gas turbine engine, labyrinth teeth 34 may be formed by the wound filaments on the outer surface of the shroud.

It is further preferable that the surfaces of the blades, shrouds and platforms be surfaced with sheet material to give greater structural strength to the rotor assembly and also to minimize abrasion of the tensioned fibers employed in the rotor construction. Thus, to this end it will be seen in the drawings that sheet material, identified by legends, is bonded to the outer surfaces of the blade, the platform surfaces of the pedestals, and the inner surfaces of the shroud 16. Further, the disc 12 may also be appropriately surfaced with such sheet material. Where glass filaments are used in the rotor construction, fiber glass cloth would normally be used as the sheet material.

As indicated, the several components of the rotor 10 are bonded to provide an integral rotor. This is most readily accomplished through the use of dies which can exert pressure on the fibers and impart a precise, desired shape to the several components of the structure as they are bonded together by an appropriately supplied bonding agent. The bonding techniques can be selected from existing or improved technology in the molding field.

For those skilled in the art it will be apparent that the size and number of filaments would be determined by the selected material for a given set of requirements.

The inventive concepts herein thus provide the rotor construction having generally balanced structural strength and particularly enable the utilization of blades having high structural strength through the provision of improved means for providing the platform surfaces which define the inner bounds of the air flow path through the rotor. Variations in the specific embodiment shown will occur to those skilled in the art, and the scope of the present inventive concepts is therefore to be derived solely from the following claims.

Having thus described the invention, what is claimed as novel and desired to be secured by Letters Patent of the United States is:

1. A turbomachinery rotor comprising,
   a disc,
   a plurality of blades extending radially from said disc, said blades comprising a core structure of radially extending filaments which also curve into and form, at least in part, said disc,
   a plurality of pedestals respectively disposed between said blades at their bases, the outer surfaces of said pedestals providing platforms for defining the inner bounds of the gas flow path through the rotor,
   a continuous hoop formed by filament material wound about said pedestals, and
   means for bonding said filaments and hoops together, whereby said rotor is an integral fabrication.

2. A turbomachinery rotor as in claim 1 wherein, the pedestals have circumferentially aligned grooves into which the filament hoop is wound.

3. A turbomachinery rotor as in claim 2 wherein,
   the pedestals have two sets of circumferentially aligned grooves,
   said hoop is wound into one set of grooves and a second hoop is wound into the other set of grooves,
   the core structure of the blades extends between said hoops, and
   the inner surfaces of said pedestals are smoothly curved with the filaments of the core structure bending thereabout as they extend into the disc, with a minimum of stress thereon.

4. A turbomachinery rotor as in claim 3 wherein, said blades further comprise "patch pieces" at opposite ends of the core structure which define the leading and trailing edges of the blades, which overlie said hoops.

5. A turbomachinery rotor as in claim 4 wherein, the "patch pieces" comprise radially exendintg filaments, portions of which overhang said hoops, extend radially inwardly, and are woven into the core filaments which extend into the disc.

6. A turbomachinery rotor as in claim 5 wherein, the blades and the outer platform surfaces of the pedestals are surfaced with sheet material.

7. A turbomachinery rotor as in claim 3 wherein,
   a shroud joins the outer ends of the blades,
   the filaments of the core material, at their outer ends are separated along the chord line of the blade and bent in opposite circumferential directions to form the inner portion of said shroud, and
   a wound filament material hoop overlies the bent portions of the blade filaments to form the outer portion of the shroud.

8. A turbomachinery rotor as in claim 7 wherein,
   said blades further comprise "patch pieces" at opposite ends of the core structure which define the leading and trailing edges of the blades which overlie said hoops,
   said "patch pieces" comprising radially extending filaments, portions of which overhang said hoops, extend radially inwardly, and are woven into the core filaments which extend into the disc,
   the filaments of said "patch pieces" also being separated along the chord line of the blade and bent in opposite circumferential directions to further form the inner portion of said shroud, and
   said wound filament hoop also overlying the oppositely bent portions of the "patch pieces" in forming the outer portion of said shroud.

9. A turbomachinery rotor as in claim 8 wherein,
   the surfaces of said blades, the inner surface of said outer shroud, and the outer platform surfaces of said pedestals are surfaced with sheet material.

10. A turbomachinery rotor as in claim 9 wherein,
    said filament material is glass, said sheet material is woven glass fiber cloth, said pedestals are formed of a thermosetting resin, and said bonding means comprises a curved epoxy resin.

References Cited

UNITED STATES PATENTS

| | | |
|---|---|---|
| 2,857,094 | 10/1958 | Erwin. |
| 3,025,037 | 3/1962 | Beckstrom. |
| 3,095,138 | 6/1963 | Warnken. |
| 3,403,844 | 10/1968 | Stoffer. |
| 2,855,179 | 10/1958 | Brown. |

FOREIGN PATENTS 965,370  6/1957  Germany.

HENRY F. RADUAZO, Primary Examiner

U.S. Cl. X.R.
170—159; 253—77